(12) United States Patent
Porter

(10) Patent No.: US 6,767,502 B2
(45) Date of Patent: Jul. 27, 2004

(54) BUMPER BEAM EXTENSIONS

(75) Inventor: Marshall Ray Porter, Oakdale, IL (US)

(73) Assignee: Conix Corporation, Dearborn, MI (US)

(*) Notice: Subject to any disclaimer, the term of this patent is extended or adjusted under 35 U.S.C. 154(b) by 328 days.

(21) Appl. No.: 10/045,389

(22) Filed: Nov. 9, 2001

(65) Prior Publication Data
US 2002/0089196 A1 Jul. 11, 2002

Related U.S. Application Data

(62) Division of application No. 09/743,546, filed as application No. PCT/US99/16947 on Jul. 27, 1999, now Pat. No. 6,357,816.
(60) Provisional application No. 60/094,527, filed on Jul. 29, 1998.

(51) Int. Cl.[7] .............................................. B29D 22/00
(52) U.S. Cl. ...................................... 264/572; 29/897.2
(58) Field of Search ........................... 264/572; 29/897.2

(56) References Cited

U.S. PATENT DOCUMENTS

| | | |
|---|---|---|
| 3,829,141 A | 8/1974 | Igwe |
| 3,861,728 A | 1/1975 | Pompei et al. |
| 4,111,478 A | 9/1978 | Pompei et al. |
| 4,130,312 A | 12/1978 | Cooper, Sr. |
| 4,167,282 A | 9/1979 | Matsuyama |
| 4,225,167 A | 9/1980 | Buettner et al. |
| 4,350,221 A | 9/1982 | Ishima |
| 4,386,799 A | 6/1983 | Molnar |
| 4,422,680 A | 12/1983 | Goupy |
| 4,597,601 A | 7/1986 | Manning |
| 4,652,032 A | 3/1987 | Smith |
| 4,951,986 A | 8/1990 | Hanafusa et al. |
| 5,100,187 A * | 3/1992 | Loren .......................... 293/110 |
| 5,498,045 A | 3/1996 | Morgan et al. |
| 5,635,117 A * | 6/1997 | Fujioka et al. .............. 264/40.1 |
| 5,788,297 A | 8/1998 | Sugawara et al. |
| 5,997,057 A | 12/1999 | Gasko et al. |
| 6,000,738 A | 12/1999 | Stewart et al. |
| 6,042,163 A | 3/2000 | Reiffer |
| 6,217,089 B1 | 4/2001 | Goto et al. |

FOREIGN PATENT DOCUMENTS

JP 03166919 7/1991

* cited by examiner

Primary Examiner—Suzanne E. McDowell
(74) Attorney, Agent, or Firm—Banner & Witcoff, Ltd.

(57) ABSTRACT

A bumper beam extension for a bumper beam having left and right bumper beam extensions and a method for manufacturing the bumper beam extensions to provide impact crush resistance is disclosed. The bumper beam extensions include an insert end contoured and sized to fit in the end of the bumper beam and a main body portion having substantially a rearwardly facing saddle shape that includes an upper wing and a lower wing joined at a bight section. The main body portion is blow molded to configure the bight section to taper from a preselected distance from a forward wall of the main body portion until it is face to face with the forward wall. For increased stiffness, the bumper beam may be welded to a frame of a vehicle.

5 Claims, 4 Drawing Sheets

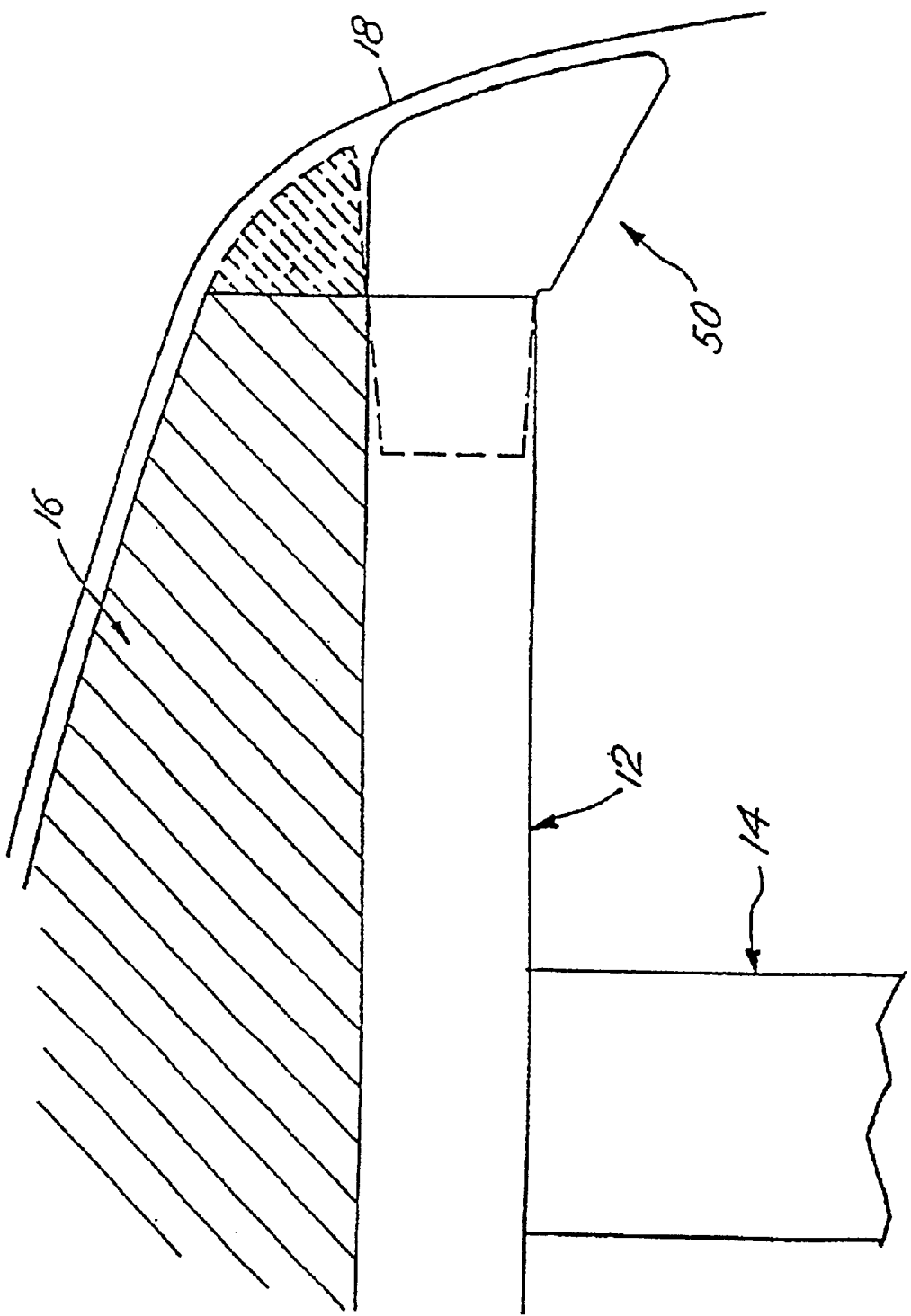

FIG. 5

52: SELECTING A MULTI-PART DIE WITH A CAVITY HAVING AN INITIAL VOLUME WHICH CORRESPONDS TO PREDETERMINED GENERAL OUTER CONTOURS OF THE BUMPER BEAM EXTENSION;

↓

54: INJECTING A FIXED AMOUNT OF MATERIAL INTO THE CAVITY OF THE DIE;

↓

56: INJECTING A GAS TO EXPAND THE MATERIAL TO THE PREDETERMINED GENERAL OUTER CONTOURS OF THE BUMPER BEAM EXTENSION FORMED BY THE DIE CAVITY, WHEREIN THE PREDETERMINED GENERAL OUTER CONTOURS INCLUDE AN INSERT END AND A MAIN BODY PORTION

↓

58: CLOSING SELECTED SECTIONS OF THE MULTI-PART DIE, WHILE THE MATERIAL IS MALLEABLE, TO FORM A BIGHT SECTION JOINING AN UPPER WING AND A LOWER WING OF A MAIN BODY SECTION, WHEREIN THE BIGHT SECTION TAPERS FROM A PRESELECTED DISTANCE FROM A FORWARD WALL OF THE MAIN BODY PORTION UNTIL IT IS FACE TO FACE WITH THE FORWARD WALL

↓

60: OPENING THE MULTI-PART DIE WHEN THE BUMPER BEAM EXTENSION IS SUBSTANTIALLY RIGID

↓

62: WELDING THE BUMPER BEAM TO A FRAME OF A VEHICLE

US 6,767,502 B2

BUMPER BEAM EXTENSIONS

FIELD OF INVENTION

This application is a division of U.S. application Ser. No. 09/743,546, filed Jul. 27, 1999, now U.S. Pat. No. 6,357,816, entitled "Bumper Beam Extensions" for which priority is claimed, which is a 35 U.S.C. 371 application of PCT/US99/16947, filed Jul. 27, 1999, which claims the benefit of provisional application No. 60/094,527, filed Jul. 29, 1998, all of which are incorporated herewith by reference in their entireties.

BACKGROUND OF THE INVENTION

In many current production vehicles, the front bumper system comprises a bumper impact beam mounted to the frame of a vehicle and covered by a fascia mounted to the vehicle body. The bumper beam must extend outside the rails of the frame to protect the vehicle during 30° corner impact tests as mandated by the FMVSS (Federal Motor Vehicle Safety Standards). The bumper beam cannot be attached to the frame at the frame factory without greatly reducing the shipping density of the frame. Therefore, the bumper beam is typically shipped separately to the assembly plant and then attached to the frame. If the bumper beam could be attached at the frame factory, it could be welded to the frame, thus providing increasing stiffness and crash integrity.

Referring to FIG. 4, some vehicles have incorporated a small blow molded end cap 50 attached to the end of the bumper beam 12 which supports the side of the fascia 18 as it extends around to the body. In the prior art, the end cap 50 does not perform any significant crush resistance. Energy absorbing foam 16 may be added to the bumper beam 12. Additional energy absorbing foam may be added forward of the end cap to support the fascia 18 during impact. However, such additions only take up space and do not provide any substantial crush resistance improvement. Thus, there is a need for a bumper beam extension that aids in providing crush resistance.

SUMMARY OF THE INVENTION

The disadvantages of the prior art may be overcome by providing a bumper beam having three parts: a center beam, a left side beam extension, and a right side beam extension. The center beam can be welded to the frame for increased stiffness and shipped with the frame from the frame factory at no additional shipping cost. The left and right side beam extensions provide 30° corner impact resistance.

According to one aspect of the invention, there is provided a bumper beam extension comprising a body having a first end configured to be inserted into an end of a bumper beam and an opposite end contoured to support a fascia. The body is shaped to provide structural rigidity.

BRIEF DESCRIPTION OF THE DRAWINGS

In drawings which illustrate an embodiment of the invention,

FIG. 4 is a top plan view, partly in section, of an extended blow molded end cap of the prior art.

FIG. 5 shows one embodiment of steps of a method in accordance with the present invention.

DETAILED DESCRIPTION OF PREFERRED EMBODIMENTS

Figure 1:
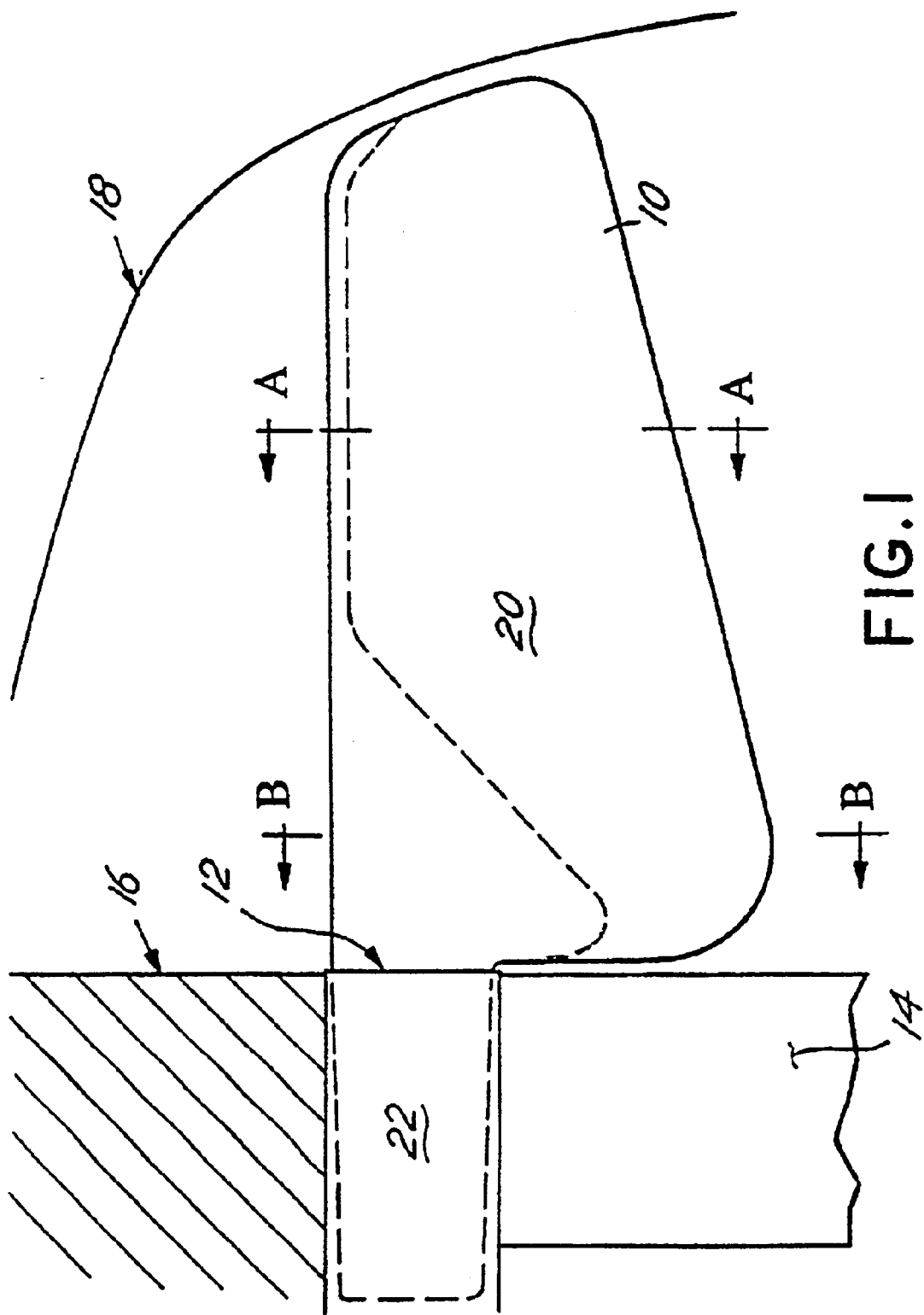
FIG. 1 is a top plan view, partly in section, of a blow molded bumper beam extension of the present invention.

The bumper beam extension 10 of the present invention is illustrated in FIG. 1. The bumper beam extension 10 is fitted in the end of a bumper beam 12. Bumper beam 12 is connected forwardly of a frame rail 14. Forwardly of the bumper beam 12 is a shaped mass of energy absorbing foam 16. Forwardly of the energy absorbing foam 16 is a fascia 18. The construction and assembly of the bumper beam 12, frame rail 14, energy absorbing foam 16 and fascia 18 is convention and well known in the art.

Figure 2:
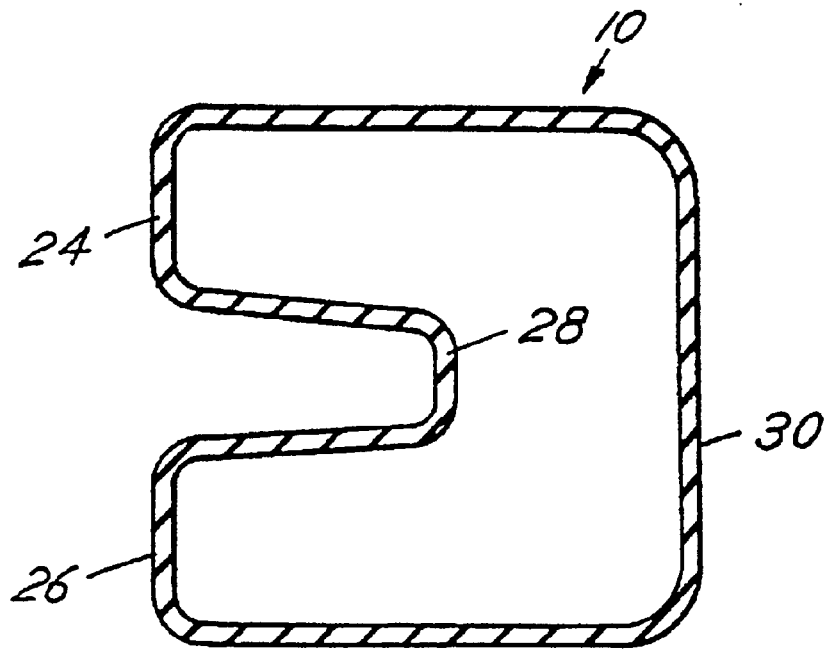
FIG. 2 is sectional view of the blow molded bumper beam extension of FIG. 1, along the line B—B.
Figure 3:
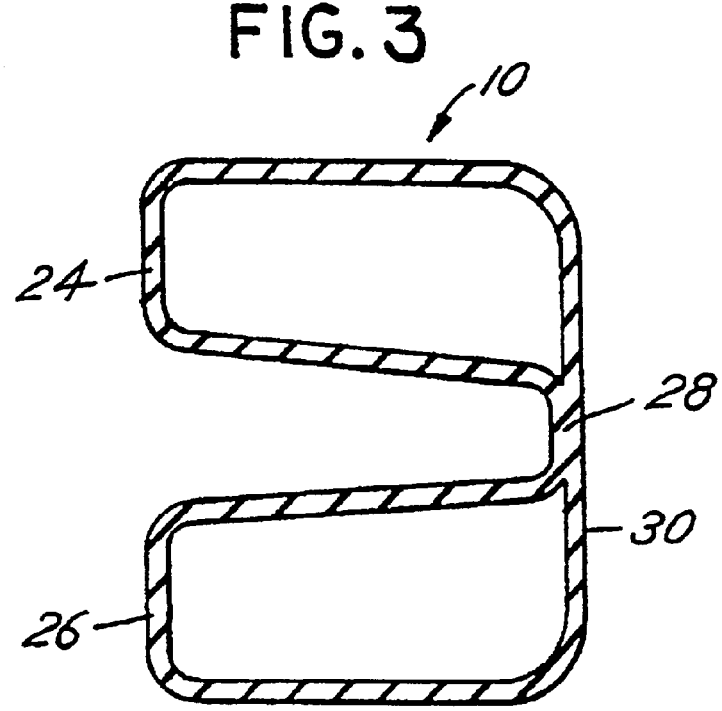
FIG. 3 is sectional view of the blow molded bumper beam extension of FIG. 1, along the A—A.

The bumper beam extension 10 comprises a main body portion 20 and an insert end 22. The insert end 22 is contoured and sized to fit in the end of the bumper beam 12 in a frictional or interference fit or otherwise secured with a positive attachment The main body 20 is preferably configured in a rearwardly facing saddle shape as illustrated in FIGS. 2 and 3. The main body portion 20 has an upper wing 24 and lower wing 26 joined at a bight section 28. In the interface with the insert end 22, along the line B—B in the section view of the blow molded bumper beam extension of FIG. 1, shown in FIG. 2, the bight section 28 is spaced from the forward wall 30, and along the line A—A in the section view of the blow molded bumper beam extension of FIG. 1, shown in FIG. 3, the bight section 28 abuts the forward wall 30. Thus, the bight section 28 tapers until it is face to face with the forward wall 30. The configuration of the main body portion 20 provides a relatively rigid construction.

FIG. 5 shows one embodiment of steps of a method in accordance with the present invention. The bumper beam extension 10 may be manufactured using blow molding techniques and multi-part dies or rotational molding techniques. A multi-part die is selected 52 to have an initial volume which corresponds to the general outer contours of the bumper beam extension. A fixed amount of material is injected 54 into the die cavity. A gas is injected 56 to expand the material to the die cavity to expand the material to the predetermined general outer contours of the bumper beam extension formed by the die cavity, wherein the predetermined general outer contours include an insert end and a main body portion. The insert end may be formed to be frictionally secured to the bumper beam, to provide an interference fit with the bumper beam, or to be secured to the bumper beam by a positive attachment While the material is still malleable, sections of the multi-part die close to form the bight section 28 joining an upper wing and a lower wing of a main body section, wherein the bight section tapers from a preselected distance from a forward wall of the main body portion until it is face to face with the forward wall. See step 58 in FIG. 5.

The die remains closed and is opened 60 when the bumper beam extension is rigid enough to remove.

The method may further include welding 62 the bumper beam to a frame of a vehicle (shown in dashed box in FIG. 5).

The above-described embodiment of the invention is intended to be an example of the present invention and alterations and modifications may be effected thereto, by those of skill in the art, without departing from the scope of the invention

What is claimed is:

1. A method for manufacturing a bumper beam extension for providing crush resistance for a bumper beam using blow molding techniques, wherein the method comprises the steps of:

selecting a multi-part die with a cavity having an initial volume which corresponds to predetermined general outer contours of the bumper beam extension;

injecting a fixed amount of material into the cavity of the die;

injecting a gas to expand the material to the predetermined general outer contours of the bumper beam extension formed by the die cavity, wherein the predetermined general outer contours include an insert end and a main body portion;

closing selected sections of the multi-part die, while the material is malleable, to form a bight section joining an upper wing and a lower wing of a main body section, wherein the bight section tapers from a preselected distance from a forward wall of the main body portion until it is face to face with the forward wall; and opening the multi-part die when the bumper beam extension is substantially rigid.

2. The method of claim 1, wherein the insert end is formed to be frictionally secured to the bumper beam.

3. The method of claim 1, wherein the insert end is formed to provide an interference fit with the bumper beam.

4. The method of claim 1, wherein the insert end is formed to be secured to the bumper beam by a positive attachment.

5. The method of claim 1, further including welding the bumper beam to a frame of a vehicle.

* * * * *